(12) United States Patent
Cavalieri

(10) Patent No.: US 9,987,957 B2
(45) Date of Patent: Jun. 5, 2018

(54) ARMREST FOR A MOTOR VEHICLE

(71) Applicant: Dr. Ing. h.c.F. Porsche Aktiengesellschft, Stuttgart (DE)

(72) Inventor: Gino Cavalieri, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days. days.

(21) Appl. No.: 15/667,042

(22) Filed: Aug. 2, 2017

(65) Prior Publication Data

US 2017/0327014 A1    Nov. 16, 2017

Related U.S. Application Data

(63) Continuation-in-part of application No. 15/143,721, filed on May 2, 2016.

(30) Foreign Application Priority Data

Jun. 15, 2015   (DE) ................... 10 2015 109 523

(51) Int. Cl.
 *B60N 2/00* (2006.01)
 *B60N 2/46* (2006.01)
(52) U.S. Cl.
 CPC ............. *B60N 2/466* (2013.01); *B60N 2/464* (2013.01); *B60N 2/4633* (2013.01)

(58) Field of Classification Search
 CPC ...... B60N 2/46; B60N 2/4626; B60N 2/4633; B60N 2/464; B60N 2/466; B60N 4/666
 USPC ............................................. 296/153
 See application file for complete search history.

(56) References Cited

U.S. PATENT DOCUMENTS

| 6,905,163 | B2 * | 6/2005 | Bornchen | B60N 2/4626 296/1.09 |
|---|---|---|---|---|
| 7,537,268 | B2 * | 5/2009 | Becker | B60N 2/0232 296/1.09 |
| 2003/0052501 | A1 * | 3/2003 | Schmidt | B60K 37/06 296/37.13 |
| 2004/0100136 | A1 * | 5/2004 | Bornchen | B60N 2/4626 297/411.21 |

* cited by examiner

*Primary Examiner* — Joseph D. Pape
(74) *Attorney, Agent, or Firm* — Gerald E. Hespos; Michael J. Porco; Matthew T. Hespos

(57) ABSTRACT

An armrest (1) for a motor vehicle has a vehicle-side support (3). An armrest element (5) is arranged on an upper side of the support (3) and is designed to be adjustable relative to the support (3) The armrest (1) has a further functional element arranged on the upper side of the support (3) at a distance from the armrest element (5) and is designed to be adjustable relative to the support (3).

5 Claims, 3 Drawing Sheets

ARMREST FOR A MOTOR VEHICLE

CROSS REFERENCE TO RELATED APPLICATION

This application is a continuation-in-part of application Ser. No. 15/143,721 filed on May 2, 2016, which claims priority under 35 USC 119 to German Patent Appl. No. 10 2015 109 523.8 filed on Jun. 15, 2015, the entire disclosures of which is incorporated herein by reference.

BACKGROUND

1. Field of the Invention

The invention relates to an armrest for a motor vehicle with a vehicle-side support and an armrest element disposed on an upper side of the support and designed to be adjustable relative to the support.

2. Description of the Related Art

Armrests used in motor vehicles generally are integrated into lateral door trims or center consoles and offer no adjustment possibilities at all. The armrests thus always have the same position and height and cannot be adjusted in dependence on the seat position. An individual setting of the armrests that is adapted to the driver or passenger of the motor vehicle thus generally is not possible.

On the other hand, adjustable armrests that are integrated into a door trim of a vehicle door are known in principle from the prior art. For example, DE 10 2006 005 795 A1 describes an adjustable armrest for a motor vehicle that has an elastic support. The elastic support is connected fixedly at one point to a body part or a door of the motor vehicle and, at another is pivotable by a lifting drive. DE 10 2006 026 838 A1 discloses a height-adjustable armrest for a motor vehicle. The adjustment of the armrest is made by an eccentric shaft. EP 1 339 564 B1 discloses an armrest that is in an inner door trim and that is adjustable in the vertical direction of a vehicle.

An object of the present invention is to provide an an adjustable armrest that offers a further increased degree of comfort.

SUMMARY

An armrest for a motor vehicle according to the invention has a further functional element arranged on the upper side of the support at a distance from the armrest element and is designed to be adjustable relative to the support. The further functional element whose position relative to the vehicle-side support can be altered has a positive effect on the comfort and ergonomics of the armrest. It is thus possible to adapt the positions of the armrest element and of the additional functional element independently of one another and in a targeted manner with respect to the ergonomic needs of a user of the motor vehicle. The support may be part of an inner door trim of the motor vehicle. Compromises between design and ergonomics can always arise in the creation of an inner door trim. This conflict of goals can be resolved by the armrest of the invention in that the base positions of the armrest element and of the additional functional element relative to the support are very close to the design requirements. Individual adjustment of the armrest element and the functional element makes it possible for their positions to be adapted appropriately to the ergonomic requirements of a vehicle user. The additional possibility of adjusting the functional element advantageously allows the position of the functional element to be adapted to an armrest adjusted with respect to the base position.

The armrest may have means for adjusting the height of the armrest element relative to the support. This embodiment provides the possibility of adapting the height of the armrest element relative to the support in a user-specific manner. Height adjustability is advantageous since, in terms of its ergonomics, the base height position of the armrest element can always represent only a mean value for different vehicle users. Starting from the base height position, the armrest element can be set higher or lower.

The armrest further may have means for adjusting the inclination of the armrest element relative to the support. The armrest element can be pivoted relative to the support about at least one pivot axis so that the inclination of the armrest element with respect to the support can be varied in a user-specific manner.

To simplify operation, the means for adjusting the height of the armrest element and/or the means for adjusting the inclination of the armrest element may comprise at least one first electrical adjustment device. A single electrical adjustment device may be provided to set the height and the inclination of the armrest element. Alternatively, the adjustment of the height and the inclination of the armrest element relative to the support may be effected by two electrical adjustment devices.

The armrest may have means for adjusting the height of the functional element relative to the support. This provides the possibility of adapting the height of the functional element relative to the support starting from a base height position in a user-specific manner and from the point of view of ergonomics.

The armrest further may have means for adjusting the inclination of the functional element relative to the support. This achieves a situation where the functional element can be pivoted relative to the support about at least one pivot axis so that the inclination of the functional element with respect to the support can be varied in a user-specific manner.

To simplify operation, the means for adjusting the height of the functional element and/or the means for adjusting the inclination of the functional element may comprise at least one second electrical adjustment device. Once again, a single electrical adjustment device can be provided to set the height and the inclination of the armrest element. Alternatively, the adjustment of the height and the inclination of the functional element relative to the support can be carried out by two electrical adjustment devices.

At least one memory may be provided in which the adjustment positions of the armrest element and the functional element are stored so that they can be called up. For example, it is possible, by pressing a memory key, to store the adjustment positions of the armrest element and of the functional element in the memory so that they can be called up. The memory may be designed to store the adjustment positions of the armrest element and of the functional element so that they can be called up for a plurality of vehicle users. The reading of the storage and the setting of the adjustment positions of the armrest element and of the functional element can, for example, take place automatically after the motor vehicle has been opened by a key-based or keyless vehicle access device. Alternatively, the interior of the motor vehicle can be provided with a plurality of selection keys that are linked with the memory so that, by actuating one of the selection keys, the positions of the armrest element and of the functional element are set automatically.

The functional element may be a control panel with a number of control elements, such as control keys and/or control levers, by means of which electrical functional components of the motor vehicle, such as, electric window winders, electrically adjustable outside mirrors or electrical seat adjustment devices, can be actuated. The adaptation of the height and/or of the inclination of the control panel and the adaptation of the height and/or inclination of the armrest element allow particularly effective adaptation to the ergonomic requirements of different vehicle users.

In an alternative embodiment, the functional element can be a further armrest element.

Further features and advantages of the present invention will become clear from the following description of a preferred exemplary embodiment with reference to the appended drawings.

DETAILED DESCRIPTION

Figure 1:
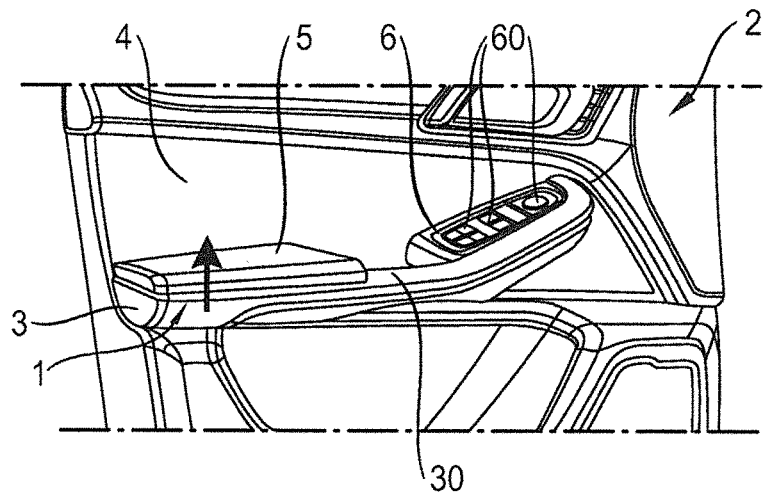
FIG. 1 is a perspective view of an armrest of a motor vehicle according to an exemplary embodiment of the invention and illustrates a height adjustment of an armrest element.

An armrest 1 according to an exemplary embodiment of the invention is arranged on a vehicle door 2 and comprises a vehicle-side support 3. The support 3 is part of an inner trim 4 that covers an inner door panel of the vehicle door 2 relative to the vehicle interior.

The support 3 is configured in one piece and made of plastic. A gripping recess 30 is provided in the support 3 and enables a user to grip the support 3 of the armrest 1 to open and close the vehicle door 2. The armrest 1 further comprises an armrest element 5 that is designed to be adjustable relative to the support 3. The armrest element 5 extends substantially in the longitudinal direction of the motor vehicle when the vehicle door 2 is closed.

Figure 7:
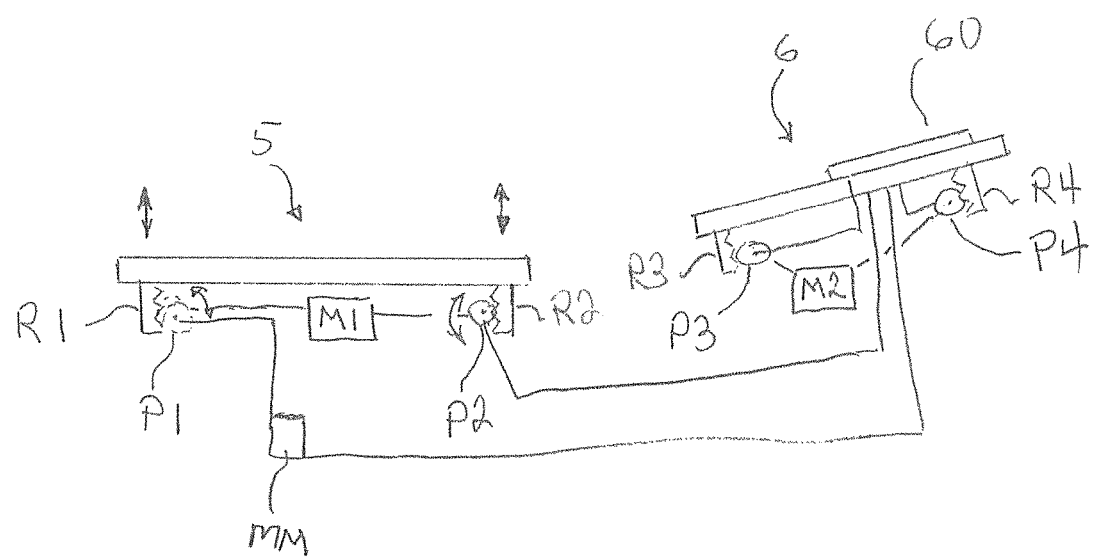
FIG. 7 is a schematic view of an electrical adjustment device for the height adjustment and the pivoting movement of the armrest element and of the control panel.

As shown in FIG. 1, the armrest element 5 is designed so that it is height-adjustable relative to the support 3. Thus, the height of the armrest element 5 relative to the support 3 can be adapted in a user-specific manner. For this purpose, the armrest 1 comprises means for adjusting the height of the armrest element 5 relative to the support 3, which means preferably comprise an electrical adjustment device, such as an electrically driven rack and pinion, a worm gear or the like. For instance, FIG. 7 shows a first electrically driven rack and pinion R1, P1 and a second electrically driven rack and pinion R2, P2 for adjusting the height of the armrest element 5 relative to the support. Power for driving the pinions P1 and P2 can be provided by a motor M1 connected to the pinions P1 and P2 by appropriate gears or a Cardan shaft.

Figure 2:
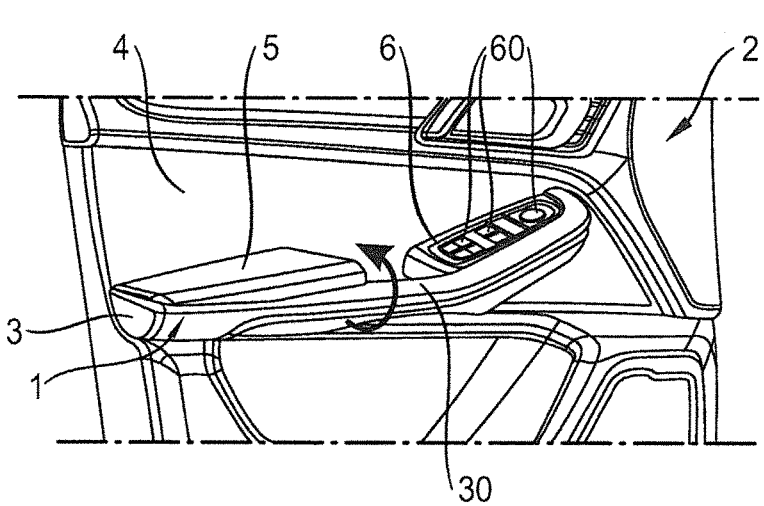
FIG. 2 is a perspective view of the armrest and illustrates a pivoting movement of the armrest element about a pivot axis.
Figure 3:
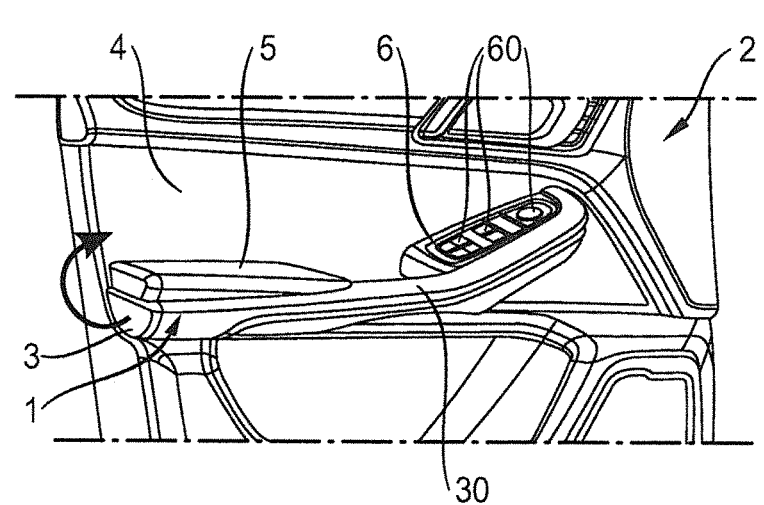
FIG. 3 is a further perspective representation of the armrest that illustrates the pivoting movement of the armrest element.

As shown in FIGS. 2 and 3, the armrest element 5 is designed to be pivoted relative to the support 3. In this way, the inclination of the armrest element 5 with respect to the support 3 can be altered. For this purpose, the armrest 1 comprises means, such as an electrical adjustment device, with spur gears for adjusting the inclination of the armrest element 5 relative to the support 3. The pivot axis about which the armrest element 5 can be pivoted extends orthogonally to a longitudinal axis of the armrest element 5 and thus also substantially perpendicular to the inner trim 4 of the vehicle door 2. The armrest 1 can have a single (first) electrical adjustment device for adjusting the height and adjusting the inclination of the armrest element 5 relative to the support 3. Alternatively, as shown in FIG. 7, the first and second electrically driven rack and pinion R1, P1, and R2, P2 may be selectively activated to pivot the armrest element 5 relative to the support 3.

As can be seen in the figures, the armrest 1 has a control panel 6 in front of the gripping recess 30 in the longitudinal direction of the vehicle door 1. The control panel is arranged on a front portion of the support 3 that extends obliquely up for reasons of ergonomics. The control panel 6 has a number of control elements 60, in particular a number of control keys and/or control levers, by means of which electrical functional components of the motor vehicle, such as, electric window winders, electrically adjustable outside mirrors or electrical seat adjustment devices, can be actuated.

Figure 4:
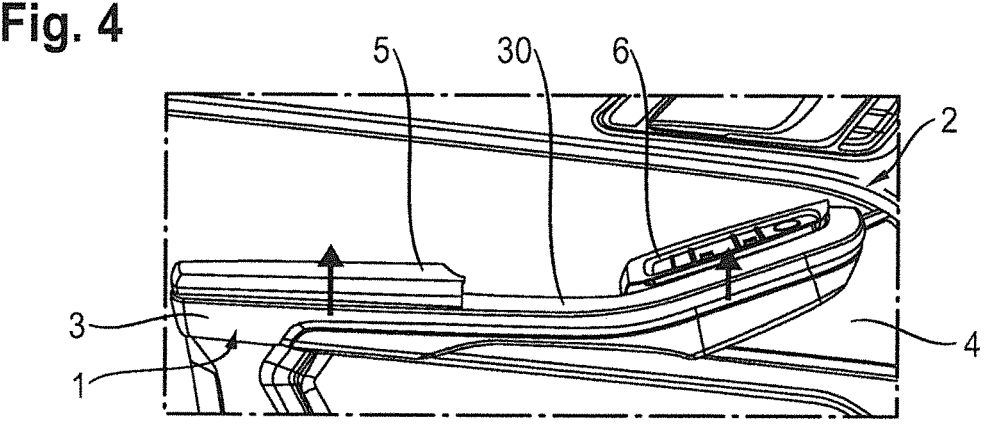
FIG. 4 is a side view of the armrest that illustrates a height adjustment of the armrest element and of a control panel.

It becomes clear from FIG. 4 that the control panel 6 is designed to be height-adjustable relative to the support 3 so that the height of the control panel 6 relative to the support 3 can be adapted in a user-specific manner. For this purpose, the armrest 1 comprises means for adjusting the height of the control panel 6 relative to the support 3, which means preferably comprises an electrical adjustment device. As shown in FIG. 7, the electrical adjustment device comprises a third rack and pinion R3, P3 and a fourth rack and pinion R4, P4 for adjusting the height of the control panel 6 relative to the support. Power for driving the pinions P3 and P4 can be provided by a motor M2 connected to the pinions P3 and P4 by appropriate gears or a Cardan shaft.

Figure 5:
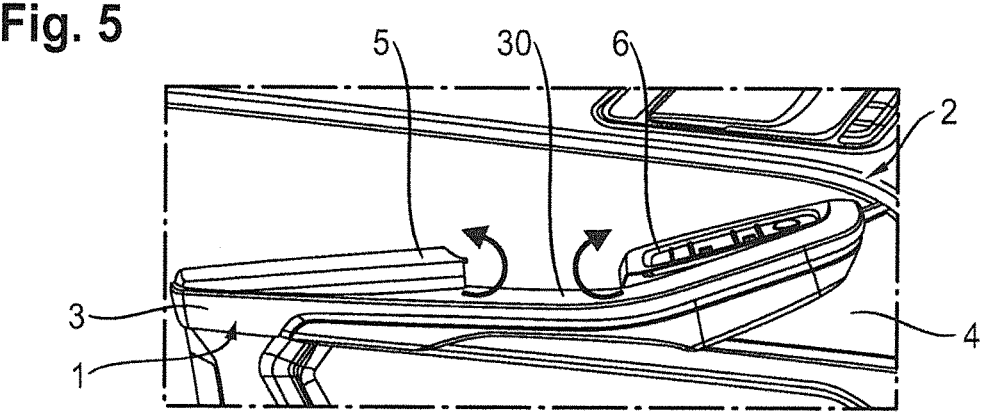
FIG. 5 is a further side view of the armrest and illustrates the pivoting movement of the armrest element and of the control panel.
Figure 6:
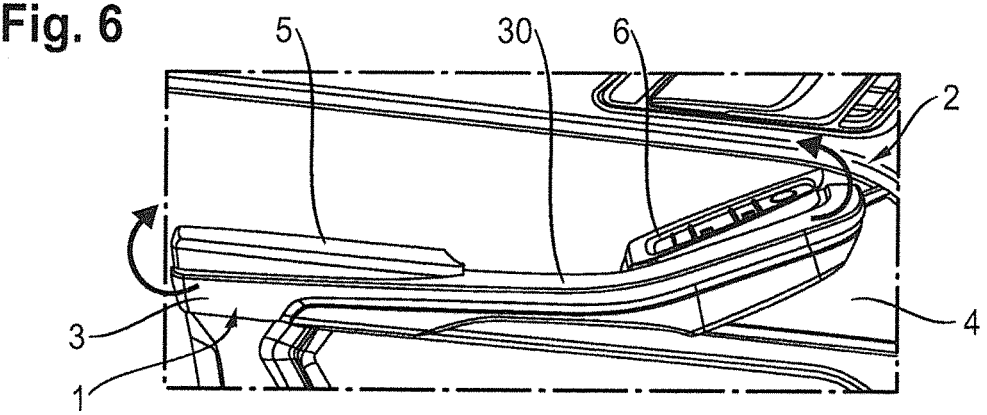
FIG. 6 is a further side view of the armrest and illustrates the pivoting movement of the armrest element and of the control panel.

As shown in FIGS. 5 and 6, the control panel 6 is designed to be pivoted relative to the support 3. This provides the possibility of altering the inclination of the control panel 6 relative to the support 3. For this purpose, the armrest 1 comprises means, such as an electrical adjustment device, for adjusting the inclination of the control panel 6 relative to the support 3. As shown in FIG. 7, the third and fourth rack and pinions R3, P3 and R4, P34 may be selectively engaged to pivot the control panel 6 relative to the support 3. The pivot axis about which the control panel 6 can be pivoted is orthogonal to a longitudinal axis of the control panel 6 and thus substantially perpendicular to the inner trim 4 of the vehicle door. The armrest 1 can have a single (second) electrical adjustment device for adjusting the height and the the inclination of the control panel 6 relative to the support 3.

The armrest element 5 and the control panel 6 thus can be adjusted independently of one another in terms of their height and inclination relative to the support 3, thus enabling user-specific, ergonomic adaptation of the positions of the armrest element 5 and of the control panel 6.

The adjustment travels of the armrest element 5 and the control panel 6 preferably are selected so that in each case maximum adjustment travels are achieved in a mid-two-digit millimeter range (thus approximately between 40 and 60 mm, preferably approximately 50 mm).

As shown in FIG. 7, there also can have at least one memory means MM within which the adjustment positions of the armrest element 5 and of the control panel 6 are stored so that they can be called up. Thus, it is possible that by pressing a memory key, to store the adjustment positions of the armrest element 5 and of the control panel 6 in a nonvolatile memory so that they can be called up. It is expedient in this connection if the memory is designed to store the adjustment positions of the armrest element 5 and the control panel 6 so that they can be called up for a plurality of vehicle users. The reading of the memory and the setting of the adjustment positions of the armrest element 5 and of the control panel 6 can, for example, take place automatically after the vehicle door is opened by a key-based or keyless vehicle access device or by actuating a selection key in the interior of the motor vehicle.

What is claimed is:

1. An armrest for an inner surface of a motor vehicle door, comprising:
 a support mounted on the inner surface of the motor vehicle door and extending in a longitudinal direction of the motor vehicle;
 an armrest element arranged on an upper side of the support;
 a control panel element arranged on the upper side of the support and spaced from the armrest element in the longitudinal direction;
 a first means for adjusting at least one of a height and an angle of inclination of the armrest element relative to the support; and
 a second means for adjusting at least one of a height and an angle of inclination of the control panel element relative to the support.

2. The armrest of claim 1, wherein the first means for adjusting at least one of the height and the angle of inclination of the armrest element comprises at least one first electrical adjustment device.

3. The armrest of claim 1, wherein the second means for adjusting at least one of the height and the angle of inclination of the control panel element comprises at least one second electrical adjustment device.

4. The armrest of claim 1, further comprising at least one memory means within which adjustment positions of the armrest element and/or the control panel element are stored.

5. The armrest of claim 1, wherein the control panel element is designed as a further armrest element.

* * * * *